United States Patent
Assadian et al.

(10) Patent No.: US 10,606,455 B2
(45) Date of Patent: Mar. 31, 2020

(54) METHOD FOR PROCESSING INFORMATION

(71) Applicant: ISOTROPIX, Montpellier (FR)

(72) Inventors: Sam Assadian, Montpellier (FR); Sebastien Guichou, Montpellier (FR); Yann Couderc, Plouharnel (FR)

(73) Assignee: ISOTROPIX, Montpellier (FR)

( * ) Notice: Subject to any disclaimer, the term of this patent is extended or adjusted under 35 U.S.C. 154(b) by 377 days.

(21) Appl. No.: 15/643,581

(22) Filed: Jul. 7, 2017

(65) Prior Publication Data

US 2017/0308274 A1    Oct. 26, 2017

Related U.S. Application Data

(62) Division of application No. 14/390,787, filed as application No. PCT/FR2013/050722 on Apr. 2, 2013, now Pat. No. 9,733,813.

(30) Foreign Application Priority Data

Apr. 5, 2012 (FR) ..................... 12 53154
Apr. 5, 2012 (FR) ..................... 12 53155
Apr. 5, 2012 (FR) ..................... 12 53156

(51) Int. Cl.
    *G06F 3/0484*     (2013.01)
    *G06T 17/00*      (2006.01)

(52) U.S. Cl.
    CPC ........ *G06F 3/04842* (2013.01); *G06T 17/005* (2013.01)

(58) Field of Classification Search
    CPC ................................................ G06F 3/04842
    See application file for complete search history.

(56) References Cited

U.S. PATENT DOCUMENTS 6,816,175 B1 * 11/2004 Hamp ............... G06F 16/90344
                                                715/854
9,304,981 B1 * 4/2016 Patidar .............. G06F 16/24573
(Continued)

FOREIGN PATENT DOCUMENTS

EP          1533687 A2     5/2005

OTHER PUBLICATIONS

Dongqui Qian and M. D. Gross, Proceedings of Computer Aided Architectural Design (CAAD) Futures '99. G. Augenbroe and Charles Eastman, eds, Kluwer 1999. Design Machine Group, University of Washington, Seattle, WA.

*Primary Examiner* — Anil K Bhargava
(74) *Attorney, Agent, or Firm* — Patshegen IP LLC; Moshe Pinchas

(57) ABSTRACT

The method of organizing a system of software objects having attributes comprises:
    a step (405, 410, 425, 440) of forming a hierarchical tree of groups of objects called "contexts", the tree comprising a root context in which all the other contexts and all the objects are found, each object of said tree being in a so-called context;
    a step (428) of forming, for at least one context, a so-called "global" subcontext so as to expose objects from a point of the tree of contexts;
    a step (430) of forming, for at least one context, a so-called "contextualization" directory of values of attributes for the objects of said context; and
    a step (450) of allocating, to each attribute of an object of the tree to be displayed, the value of the higher-rank attribute of the same name, of the same type and with the same modifiers, to which a value has been allocated in a contextualization directory.

11 Claims, 5 Drawing Sheets

(56) References Cited

U.S. PATENT DOCUMENTS

| | | | | |
|---|---|---|---|---|
| 2002/0060678 A1* | 5/2002 | Sowizral | ............... | G06T 15/005 345/420 |
| 2005/0108620 A1* | 5/2005 | Allyn | .................. | G06F 3/04842 715/255 |
| 2005/0268277 A1* | 12/2005 | Reeder | ...................... | G06F 8/38 717/104 |
| 2012/0089542 A1* | 4/2012 | Hettel | .................. | G06Q 10/103 706/12 |
| 2013/0198663 A1* | 8/2013 | Matas | ..................... | G06T 11/60 715/765 |

\* cited by examiner

METHOD FOR PROCESSING INFORMATION

BACKGROUND OF THE INVENTION

Field of the Invention

The present invention concerns a method and a device for processing information. It applies, in particular, to the processing of image information and, particularly, computer graphics.

Technological Background

Computer graphics (also incorrectly called "image synthesis") is the art of digital imaging. It defines graphics generated and managed by computer, where the management is based on graphical workstations, acquisition tools such as digitizers or animation cameras, manipulation tools such as the mouse or graphics tablets. It also includes storage tools and display tools, a user interface that enables interaction between the user and the computer, and the data format that provides the linkage between the rendered image and its digital elements.

The computer graphics designer (or CG artist) is a person who masters work on images (2D, 3D, CAP software, web, etc.). He is an image and computer specialist. He uses special software systems for defining the layout, retouching photos and images, vector drawing, creating a website, etc.

In 2D computer graphics, the images are created by techniques working directly on the two dimensions of the image, either:
  by creating shapes from scratch (design, painting, etc.);
  by various algorithmic processes (fractal images); or
  by image processing, i.e. modifying the properties of each pixel of a source image (photographic or drawn, etc.). These modifications can concern the dimensions of the shapes, their luminance, their color. In particular they pass through a certain number of filters (mathematical operations), the basics of which emerged with Photoshop (registered trademark).

In 3D computer graphics, the images are created according to the following main creation steps:
  modeling objects of the scene in three dimensions;
  positioning the camera and target, and their trajectory;
  positioning and adjusting the lighting;
  creating and setting textures;
  selecting the rendering mode; and
  calculating the images.

3D image synthesis basically consists of two steps:
  modeling what one wants to view or represent. This step is called "modeling"; and
  viewing what has been modeled. This step is called "rendering".

Modeling consists of having the computer store a set of geometric data and graphical characteristics allowing the model to be represented subsequently. This model is usually called the 3D scene.

Rendering is a phase that consists of transforming the 3D space into a 2D image. The rendering is generated by a program or programs, called the 3D rendering engine, built into the modeling software or not.

Rendering consists of several phases:
  calculating the lighting (referred to as "illumination");
  projecting onto the observation plane; and
  the drawing itself, possibly with texture mapping.

Additional texture mapping techniques are used for rendering more realistic effects without making the 3D models more complex.

Currently, the 2D computer graphics process is integrated or interactive, in the sense that the computer graphics designer can view the image during realization. In contrast, the successive steps of the 3D computer graphics process, which require a lot of resources, mean that the image cannot be viewed in real time during realization.

During the course of a project, for example producing an animation, the computer graphics designer generates thousands of objects and files. In fact, each image may need to be represented by a specific object. He must therefore organize these objects in order to retrieve them rapidly, especially when they have to be edited.

The richer the synthesis images, the more complex the 3D scenes that describe them are, since they are composed of a very large number of objects manipulated by the user. An image synthesis software system can generate several images in parallel and therefore many more objects than other 3D software systems.

This therefore raises the problem of individually or simultaneously organizing, selecting and manipulating the thousands of objects contained in the sessions of the software system utilizing each of the methods that are the subjects of the present invention.

No automation capable of helping in this time-consuming task is known.

BRIEF DESCRIPTION OF THE INVENTION

The aim of the present invention is to remedy these drawbacks.

To this end, the present invention envisages, according to a first aspect, a method of organizing a system of software objects having attributes, that comprises:
  a step of forming a hierarchical tree of groups of objects called "contexts", the tree comprising a root context in which all the other contexts and all the objects are found, each object of said tree being in a so-called context;
  a step of forming, for each of a plurality of contexts, a so-called "global" subcontext so as to expose objects from a point of the tree of contexts, each global subcontext serving to expose objects globally from a tree point to the entire subtree, each object that is placed in a global context being made available to all the objects of the context in which the "global" context in question, referred to as the "parent" context, and all the subcontexts of the parent context are found;
  a step of forming, for each of a plurality of contexts, a so-called "contextualization" directory of values of attributes for the objects of said context;
  a step of allocating, to at least one attribute of an object of the tree to be displayed, the value of the higher-rank attribute of the same name and the same type, to which a value has been allocated in a contextualization directory;
  a step of determining objects to be displayed; and
  a step of displaying each object to be displayed with its attributes and the values of its attributes, taking contextualization directories into account, when an attribute in a contextualization directory of a context or subcontext containing said object has been set to a value, the value of the compatible attribute of the edited object taking the value of the contextualization directory of the higher level context for which the attribute has been given a value, each context automatically inheriting attribute values associated to the higher level context to which said context belongs.

It is noted that the global contexts serve to expose objects globally from a tree point to the entire subtree. The global contexts allow the system to define a "top-down" visibility in the tree of the contexts. Thus, the global contexts of the subcontexts see all the objects that they contain as well as all the objects of the global contexts from this context to the root.

Thanks to these provisions, all objects and contexts present in a context with a directory of contextualization are consistent since they have shared attribute values. Thus, while each context is autonomous, it automatically inherits attribute values associated to the higher level context to which said context belongs.

In some embodiments, during the allocation step, each attribute of an object of the tree to be displayed is allocated the value of the higher-rank attribute of the same name, of the same type and with the same modifier, to which a value has been allocated in a contextualization directory.

By taking the modifier into account, the operation of the method is improved.

In some embodiments, the display step comprises displaying:
  objects present in the context;
  attributes of said objects;
  values of said objects;
  modifiers of values of said attributes: animation modifiers, expression modifiers of values and/or mapping modifiers of the attribute;
  if a contextualization directory exists in said context, values of attributes and modifiers defined in a global directory of said context; and
  the values of attributes and modifiers defined in each contextualization directory of a context comprising said context.

It is noted that the animation modifiers function via a curve defined by animation keys or a mathematical function; the expression modifiers of values are mathematical formulas, such as in a spreadsheet, producing an animation or not; and the mapping modifiers of the attribute allow the value of the attribute to be modified as a function of the object's position in space, its orientation and, more generally, of any multi-dimensional geometric property intrinsic to the object or resulting from its immersion in a multi-dimensional space.

In some embodiments, during the global subcontexts formation step, a global subcontext is formed in each context, except for the global subcontexts.

In some embodiments, during the global subcontexts formation step, each global subcontext has the properties of being able neither to be renamed nor deleted.

Thus, relative references or pointers can be used by any object, at any point of the tree.

In some embodiments, during the global subcontexts formation step, a "global" context receives contexts directly or in the form of short-cuts.

The objects of the subcontexts of the global contexts are made available in the same way as described earlier.

In some embodiments:
  during the tree formation step, a subcontext, referred to as "default", is generated for the root context; and
  during the allocation step, each object type of attribute to be displayed that references an object of the default context is set to the value of the object of the default context.

Thanks to these provisions, the necessity of redefining attribute values shared by several objects in the tree can be avoided.

In some embodiments, the method that is the subject of the invention comprises a step of creating at least one shortcut pointing to a context, the context pointed to by at least one shortcut remaining in its position, the step of allocating values to the attributes of the objects of said context being performed by utilizing each said shortcut.

Thanks to these provisions, a context can be utilized in several contexts without being completely copied. Jointly editing several contexts connected to each other is thus made easier.

In some embodiments, the method that is the subject of the invention comprises a step of creating at least one shortcut pointing to an object, the object pointed to by at least one shortcut remaining in its position, the step of allocating values to the attributes of said object being performed by utilizing each said shortcut.

Thanks to these provisions, an object can be utilized in several contexts without being completely copied. Jointly editing several objects connected to each other is thus made easier.

In some embodiments, during the tree formation step, when no current context is defined for creating a context or an object, a context or an object is generated in the root context and, when a current context is defined, a context or an object is generated in the current context.

Thanks to these provisions, the generation of contexts and object is uniform and, subsequently, allows the newly created object and context to be moved into another context.

In some embodiments, during the hierarchical tree formation step, each context and each object in a context is allocated a name representing at least one part of the successive chaining of the contexts that comprise it, starting from the root directory.

Thanks to these provisions, the names of the contexts and objects are intelligible.

In some embodiments, the method that is the subject of the present invention comprises:
  a step of selecting a plurality of objects;
  a step of automatically displaying a single attribute edit field for editable attributes of the same name, the same type, and able to receive the same modifiers, of at least two of the objects selected; and
  a step of jointly editing the value of editable attributes of the same name, the same type, and able to receive the same modifiers, of at least two of the objects selected.

Thanks to these provisions, a plurality of objects can be selected and jointly edited. For example, the resolution, color, font, of several multimedia contents or documents can be edited simultaneously. It is noted that an object, in the sense of these embodiments, must be understood as in object programming: an object is capable of actions ("methods" in C++) and its actions can be parameterized by modifying its attributes ("variable members" in C++).

In some embodiments, during the display step, a single attribute edit field is displayed for editable attributes of the same name and same type of at least two of the objects selected, said attributes of the same name and same type being edited jointly during the editing step.

It is recalled here that two attributes are of the same type when they can take values of the same type, e.g. boolean, floating, color, vector, digital, pointing to another object.

In some embodiments, during the display step, a single attribute edit field is displayed for editable attributes of the same name having the same modifier or modifiers, said attributes of the same name and having the same modifier or modifiers being edited jointly during the editing step.

It is recalled here that a modifier is a capacity for modification of an object.

In some embodiments, during the display step, a single attribute edit field is displayed for editable attributes of the same name having the same capacity for modification over time and/or in space, said attributes of the same name and same capacity being edited jointly during the editing step.

It is recalled here that the capacity for modification over time corresponds to animation, in particular in a sequence of images, and the capacity for modification in space corresponds to the possibility of associating a texture to an attribute of an object.

In some embodiments, the method that is the subject of the present invention comprises a step of selecting an attribute to be edited that is shared by at least two of the objects selected, and a step of selecting a mode of jointly editing the value of this attribute shared by at least two selected objects.

In some embodiments, for a said editing mode, during the editing step, all the attributes of the various objects selected having this shared attribute are set to the value of the shared attribute of the last object selected. Thus, if one object is edited, all the other objects selected can be made consistent with each other.

In some embodiments, for a said editing mode, during the editing step, the selected attribute of the various selected objects that have this attribute is given the same value. Editing is thus by absolute values. The shared absolute value can be chosen by entering this value or by moving a cursor along a scale representing all the possible values (e.g. between 0 and 1). For example, in this way exactly the same color is given to various objects represented in different images.

In some embodiments, for a said editing mode, during the editing step, the selected attribute of the various selected objects that have this attribute is altered by the same value. Editing is thus by relative values. The shared absolute value can be chosen by entering this value or by moving a cursor along a scale representing all the possible values (e.g. between 0 and 1). For example, in this way the colors of various objects represented in different images can be darkened by the same amount.

In some embodiments, for a said editing mode, during the editing step, the value of the same attribute of an object is copied and the attribute being edited is set to this value. It is noted that the object from which the shared attribute value is copied can be one of the objects selected, for example it is, by default, the value of the shared attribute of the first or last object selected, or of an object not selected. In the latter case, the selection of objects is locked beforehand.

In some embodiments, for a said editing mode, during the editing step, an object not selected is set to the value of the shared attribute. This editing mode only concerns attributes that accept one or more objects as attribute value, and which are known as "'object' type attributes".

In some embodiments, during the step of selecting a plurality of objects, the content of each of the objects selected is displayed in a shared viewer viewport and, during the joint editing step, the contents of the objects whose attributes are displayed in the shared viewer viewport are modified in real time. In this way, the effect of the joint editing on each of the objects selected is viewed.

According to a second aspect, the present invention envisages a device for organizing a system of software objects having attributes, that comprises:

a means of forming a hierarchical tree of groups of objects called "contexts", the tree comprising a root context in which all the other contexts and all the objects are found, each object of said tree being in a so-called context;

a means of forming, for each of a plurality of contexts, a so-called "global" subcontext so as to expose objects from a point of the tree of contexts, each global subcontext serving to expose objects globally from a tree point to the entire subtree, each object that is placed in a global context being made available to all the objects of the context in which the "global" context in question, referred to as the "parent" context, and all the subcontexts of the parent context are found;

a means of forming, for each of a plurality of contexts, a so-called "contextualization" directory of values of attributes for the objects of said context;

a means of allocating, to at least one attribute of an object of the tree to be displayed, the value of the higher-rank attribute of the same name and the same type, to which a value has been allocated in a contextualization directory;

a means of determining objects to be displayed; and a means of displaying each object to be displayed, with its attributes and the values of its attributes, taking contextualization directories into account, when an attribute in a contextualization directory of a context or subcontext containing said object has been set to a value, the value of the compatible attribute of the edited object taking the value of the contextualization directory of the higher level context for which the attribute has been given a value, each context automatically inheriting attribute values associated to the higher level context to which said context belongs.

As the particular features, advantages and aims of this device are similar to those of the method that is the subject of the first aspect of the present invention, they are not repeated here.

The present invention envisages, according to a third aspect, a method of organizing a system of software objects having attributes, that comprises:

a step of forming a hierarchical tree of groups of objects called "contexts", the tree comprising a root context in which all the other contexts and all the objects are found, each object of said tree being in a so-called context;

a step of forming, for at least one context, a so-called "global" subcontext so as to expose objects from a point of the tree of contexts;

a step of forming, for at least one context, a so-called "contextualization" directory of values of attributes for the objects of said context; and a step of allocating, to each attribute of an object of the tree to be displayed, the value of the higher-rank attribute of the same name, of the same type and with the same modifier, to which a value has been allocated in a contextualization directory.

It is noted that the global contexts serve to expose objects globally from a tree point to the entire subtree. Thanks to these provisions, all objects and contexts present in a context with a directory of contextualization are consistent since they have shared attribute values.

In some embodiments, during the allocation step, each attribute of an object of the tree is set to the value of the higher-rank attribute of the same name and same type, to which a value has been allocated in a contextualization directory.

Thanks to these provisions, the attributes of all the objects and contexts are consistent, regardless of their actual values.

According to a fourth aspect, the present invention envisages a device for organizing a system of software objects having attributes, that comprises:
- a means of forming a hierarchical tree of groups of objects called "contexts", the tree comprising a root context in which all the other contexts and all the objects are found, each object of said tree being in a so-called context;
- a means of forming, for at least one context, a so-called "global" subcontext so as to expose objects from a point of the tree of contexts;
- a means of forming, for at least one context, a so-called "contextualization" directory of values of attributes for the objects of said context; and
- a means of allocating, to each attribute of an object of the tree to be displayed, the value of the higher-rank attribute of the same name, of the same type and with the same modifiers, to which a value has been allocated in a contextualization directory.

As the particular features, advantages and aims of this device are similar to those of the method that was the subject of the third aspect of the present invention, they are not repeated here.

The present invention envisages, according to a fifth aspect, a method of processing information for editing objects having attributes, that comprises:
- a step of selecting a plurality of objects;
- a step of automatically displaying a single attribute edit field for editable attributes of the same name of at least two of the objects selected; and
- a step of jointly editing the value of editable attributes of the same name for at least two of the objects selected.

Thanks to these provisions, a plurality of objects can be selected and jointly edited. For example, the resolution, color, font, of several multimedia contents or documents can be edited simultaneously. It is noted that an object, in the sense of the present invention, must be understood as in object programming: an object is capable of actions ("methods" in C++) and its actions can be parameterized by modifying its attributes ("variable members" in C++).

In some embodiments, the method that is the subject of the present invention comprises a step of selecting an attribute to be edited that is shared by at least two of the objects selected, and a step of selecting a mode of jointly editing the value of this attribute shared by at least two selected objects.

According to a sixth aspect, the present invention envisages a device for processing information for editing objects having attributes, that comprises:
- a means of selecting a plurality of objects;
- a means of automatically displaying a single attribute edit field for editable attributes of the same name of at least two of the objects selected; and
- a means of jointly editing the value of editable attributes of the same name for at least two of the objects selected.

As the particular features, advantages and aims of this device are similar to those of the method that is the subject of the fifth aspect of the present invention, they are not repeated here.

The present invention envisages, according to a seventh aspect, a method of editing layers represented in a viewport for editing image layers, that comprises:
- a step of selecting an object in a representation of objects;
- a step of selecting a layer in the layer editor viewport;
- a step of adding the object in said layer;
- a step of determining whether the selected object is in at least one other layer of the same image; and
- if the object is in at least one layer of the same image, a step of removing said object from each layer other than the selected layer.

Thanks to these provisions, editing a layer is particularly simple and visual. In addition, having a single object duplicated in different layers is automatically avoided.

In some embodiments, the method that is the subject of the invention comprises a step of generating a plurality of representations of objects, the object selection step being performed on any of the representations of the object.

Thanks to these provisions, the user can view in different ways the objects that he can select for the purposes of editing layers.

In some embodiments, the object selection step is performed by pressing on a button of a pointing device, the cursor of which is positioned over the representation of the object, and wherein the step of selecting a layer is carried out by moving the cursor over the representation of the layer in the layer editor without releasing said button, and by releasing said button once the cursor of the pointing device is over the selected layer.

Thanks to these provisions, a simple "drag and drop" is sufficient to edit a layer.

According to an eighth aspect, the present invention envisages a device for editing layers represented in a viewport for editing image layers, that comprises:
- a means of selecting an object in a representation of objects;
- a means of selecting a layer in the layer editor viewport;
- a means of adding the object in said layer;
- a means of determining whether the selected object is in at least one other layer of the same image; and
- a means of removing an object designed, if the object is in at least one layer of the same image, to remove said object from each layer other than the selected layer.

As the particular features, advantages and aims of this device are similar to those of the method that is the subject of the seventh aspect of the present invention, they are not repeated here.

The various aspects of the present invention and the principal or particular characteristics of the various aspects of the present invention are intended to be combined to form a single method and a single device for processing data.

BRIEF DESCRIPTION OF THE DRAWINGS

Other advantages, aims and characteristics of the present invention will become apparent from the description that will follow, made, as an example that is in no way limiting, with reference to the drawings included in an appendix, wherein.

DETAILED DESCRIPTION OF EMBODIMENTS OF THE INVENTION

Figure 1:
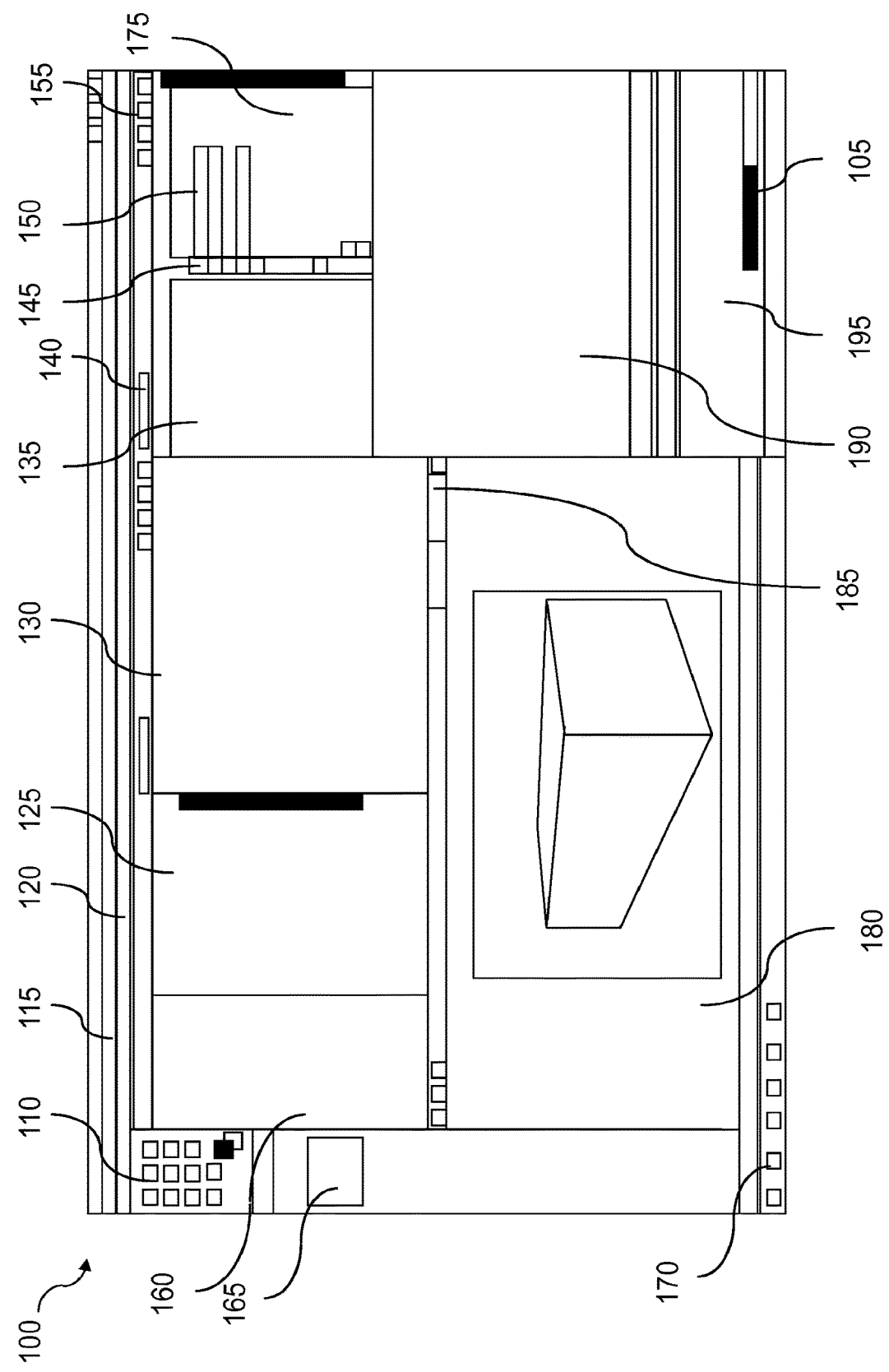
FIG. 1 represents, schematically, a screen for jointly editing attributes of a plurality of objects, utilized in a particular embodiment of the joint editing method that is the subject of the present invention.

FIG. 1 shows an interface for editing attributes of objects, displayed on a screen 100. This interface comprises:
- an address bar 120 of the project being edited, wherein appears the name of the project selected by the user, for example by navigation in a project list, the address being able to comprise the entire path for accessing the project selected (e.g. "c://projects/auto project/sports car"); the address bar 120 makes it possible to navigate to an object that may be found in hierarchically organized contexts;
- a hierarchized list 160 of directories connected to the project being processed;
- a list of objects 125 present in the directory selected in the list 160 that can be selected;
- a viewport 130 displaying the content of the last object selected;
- a toolbox 110, in which icons can be selected by the user for drawing in an image view viewport 180;
- a main menu 115 containing titles of drop-down menus of known type (e.g. "File", "Edit", "Create", "Tools", "Animate", "Render", "Filter", "Window", "Layout" and "Help");
- a series 170 of icons for opening other programs or file directories, linked to the operating system of the computer system on which the software implementing the method that is the subject of the present invention runs, e.g. the Windows (registered trademark) task bar;
- an image preview viewport 165, in which the image is modified in real time according to editing commands and drawing commands used by the user;
- a viewport 175 for editing multiple attributes comprising a list of attributes of objects selected 135, a selection locking button 140, a viewport 145 for graphically representing the type of attribute and/or its modifiers, a representation 150 of the permissible variation range or the digital value of the attribute opposite said range, icons 155 for managing the attribute editor viewport;
- a progress indicator 185 for the calculation of the image to be viewed, as a percentage;
- a selected objects browser 190;
- a layers editor 195; and
- a calculation progress bar 105, which changes color during the progress of the calculations.

Once the user has selected objects in the list 125, for example by successive selections with a pointing device such as a mouse, possibly with control ("ctl") keys, the attributes of the objects selected are aggregated, automatically, in the attributes list 135.

The attributes of a plurality of objects that bear the same name and have the same type and the same modifiers are brought together in a single attribute in the attributes list 135.

In the viewport 175 for editing multiple attributes, the selection of objects can be locked by activating the selection locking button 140. Each attribute type, e.g. boolean, floating, color, vector, digital and object, and/or each modifier type, e.g. animatable or texturable, corresponds to a graphical representation, or icon, which is represented in the viewport 145.

By selecting an attribute, the user can edit its value by utilizing the representation 150 opposite the selected attribute, which represents the permissible variation range or the digital value of the attribute.

As described with reference to FIG. 2, this editing can be by absolute values, by relative values, by copying the value of the first or last object selected, or by "drag and drop" from one of the objects, in particular from an object not selected. All the attributes of the objects selected that are unified in the attribute in the list 135 opposite the representation 150 are set to the new values.

Figure 2:
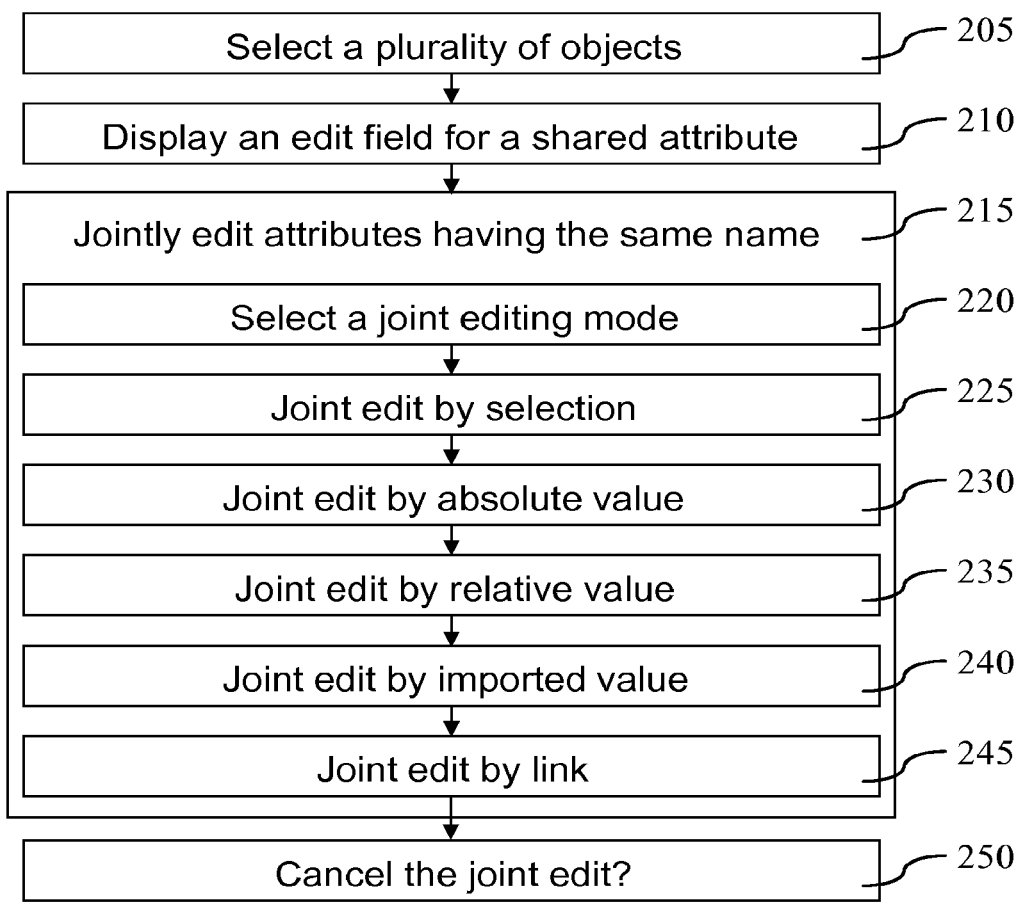
FIG. 2 represents, in the form of a logical diagram, steps in a particular embodiment of the method of jointly editing objects according to the present invention.

FIG. 2 shows a method of processing information for editing objects having attributes, that comprises:
- a step 205 of selecting a plurality of objects;
- a step 210 of automatically displaying a single attribute edit field for editable attributes of the same name, the same type, and able to receive the same modifiers, of at least two of the objects selected; and
- a step 215 of jointly editing the value of editable attributes of the same name, the same type, and able to receive the same modifiers, of at least two of the objects selected.

In this way, a plurality of objects can be selected and jointly edited. For example, the resolution, color, font, of several multimedia contents or documents can be edited simultaneously.

Preferably, during the display step 210, a single attribute edit field (in FIG. 1, this field has the name of the attribute, the representation of the type and the permissible variation range or value) is displayed for editable attributes of the same name and same type of at least two of the objects selected. The attributes of the same name and same type are thus edited jointly during the editing step 215. It is recalled here that two attributes are of the same type when they can take values of the same type, e.g. boolean, floating, color, vector, digital, pointing to another object.

Preferably, during the display step 210, a single attribute edit field (in FIG. 1, this field has the name of the attribute, the representation of the type and/or the modifier type, and the permissible variation range or value) is displayed for editable attributes of the same name having the same modifier or modifiers. The attributes of the same name and having the same modifier or modifiers are thus edited jointly during the editing step 215. It is recalled here that a modifier is a capacity for modification of an object.

For example, during the attributes display step 210, a single attribute edit field is displayed for editable attributes of the same name having, as modifiers, the same capacity for modification over time and/or in space. It is recalled here that the capacity for modification over time corresponds to animation, in particular in a sequence of images, and the capacity for modification in space corresponds to the possibility of associating a texture to an object.

During the objects selection step 205, the objects are, for example, displayed in a viewport of a multi-window interface. In this viewport, directories, sub-directories and objects are represented, e.g. by their name. An object is stored in a file and is defined by a path, e.g. a file representative of an image, having at least one attribute. An object, in the sense of the present invention, must be understood as in object programming: an object is capable of actions ("methods" in C++) and its actions can be parameterized by modifying its attributes ("variable members" in C++).

Object selection is done, for example, with a pointing device, by selecting a rectangle passing over several names of objects or by clicking on an object by simultaneously pressing the "Ctrl" key of the keyboard.

Attributes are viewed, for example, in another viewport of the same interface. All the editable attributes of the objects selected are represented in a column. Automatically, shared or compatible attributes (i.e. having the same name, the same type and, possibly, the same modifiers) are not duplicated. Thus, by editing a shared attribute the value of the attributes are altered for all the objects selected.

Preferably, during the objects selection step 205, the contents of the various objects selected are displayed in a sub-window other than that in which the selection is made. For example, if these objects are fixed images or sequences of images, these fixed images or the first image of each image sequence are displayed side by side in this sub-window.

Thus, preferably and as illustrated in FIG. 1, the interface comprises at least:
- a viewport listing the objects that can be selected;
- a viewport listing the aggregated attributes of the objects selected; and
- a viewport representing the content of the objects selected.

During the joint editing step 215, a shared attribute is selected for several objects, for example by clicking on this attribute's name or on the value range or the representation of the value of the attribute in question.

Then, during a step 220, an editing mode is selected, for example by clicking on the icon representing it.

In a first joint editing mode, called "by selection", during a step 225, all the attributes of the various objects selected having this shared attribute are set to the value of the attribute of the last object selected. Thus, if one object is edited, all the other objects selected can be made consistent with each other.

For example, in the image processing field, if a certain value of color or blur has been given to an image, this value is automatically given to the other images selected jointly, when the last image selected is that on which the color or blurriness selection has been chosen.

In the text processing field, if a font type and/or size have been chosen, these choices can be applied to other text selected jointly when the last selection is that of the text for which the font type or size has been chosen.

In a variant of the first editing mode, it is the first object selected that gives its attribute values to the other object selected.

In a second joint editing mode, called "by absolute value", during a step 230, the selected attribute of the various selected objects that have this attribute is given the same value. Editing is thus by absolute values. The shared absolute value can be chosen by entering this value or by moving a cursor along a scale representing all the possible values (e.g. between 0 and 1). For example, in this way exactly the same color is given to various objects represented in different images.

In a third joint editing mode, called "by relative value", during a step 235, the selected attribute of the various selected objects that have this attribute is altered by the same value. Editing is thus by relative values. The shared absolute value can be chosen by entering this value or by moving a cursor along a scale representing all the possible values (e.g. between 0 and 1). For example, in this way the colors of various objects represented in different images can be darkened by the same amount.

In a fourth joint editing mode, called "by imported value", during a step 240, the value of the same attribute of an object is copied and the attribute being edited is set to this value. It is noted that the object from which the shared attribute value is copied can be one of the objects selected, for example it is by default the value of the shared attribute of the first or last object selected, or of an object not selected. In the latter case, the selection of objects is locked beforehand, with the button 140, and then a drag and drop from the object not selected is performed.

In a fifth joint editing mode, called "by link", during a step 245, an object not selected is set to the value of the shared attribute. This editing mode only concerns "object" type attributes and is realized by, for example, a drag and drop operation or by selecting the object in a "combo box".

Preferably, during the joint editing step 215, the contents of the objects (e.g. the images) displayed in the content viewport (viewport 180 in FIG. 1) are modified in real time to view the effect of the joint editing on each of the objects selected.

Preferably, a function of cancelling the last joint edit operation or operations is provided. Thus, after a joint edit, the user can return to the status preceding this edit during a step 250.

In some embodiments, for each attribute shared by several objects, a button in the viewport for jointly editing attributes gives access to a grid representing, for each object, the value of the shared attribute that is opposite the button. In this way, the user can view and edit all the values of an attribute for different objects.

Figure 3:
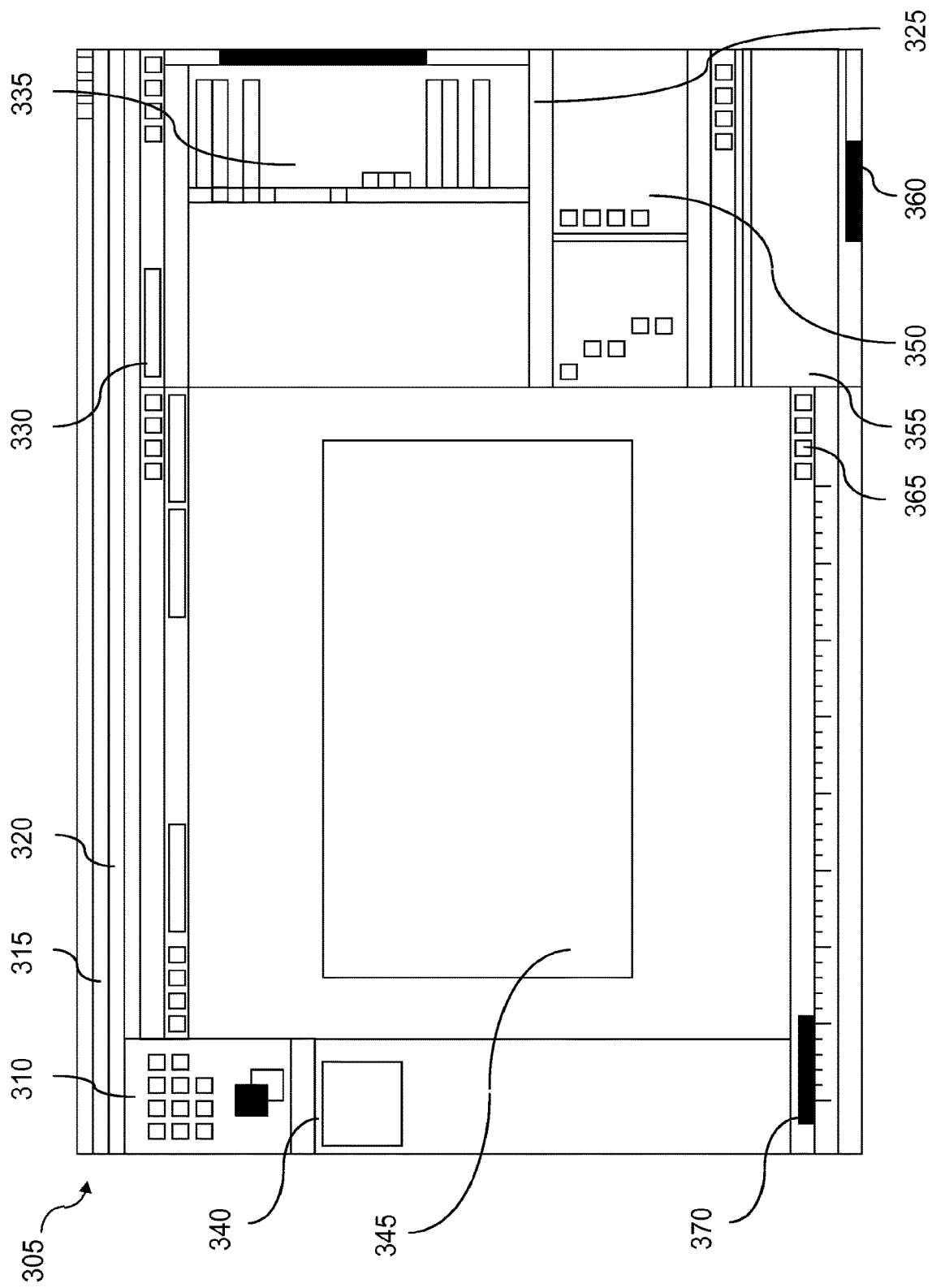
FIG. 3 represents, schematically, a screen for editing layers, utilized in a particular embodiment of the method of creating layers that is the subject of the present invention.

FIG. 3 shows an interface displayed on a screen 305. This interface comprises:
- a toolbox 310, in which icons can be selected by the user for drawing in an image view viewport 345;
- a main menu 315 containing titles of drop-down menus of known type (e.g. "File", "Edit", "Create", "Tools", "Animate", "Render", "Filter", "Window", "Layout" and "Help");
- an address bar 320 of the current context;
- an image preview viewport 340, in which the image is modified in real time according to editing commands and drawing commands;
- a selection locking button 330;
- a viewport for editing multiple attributes 335;
- buttons 325 for managing the content of the edit windows;
- a context browser 350;
- a layers editor 355;
- a calculation progress bar 360, which changes color during the progress of the calculations;
- workspace management buttons 365, in particular for the image view viewport 345; and
- a timeline 370 allowing the image represented in the image view viewport 345 to be located within a sequence of images, for example an animation in synthesis images.

The operation of each of the viewports shown in FIG. 3 is explained below.

Figure 4:
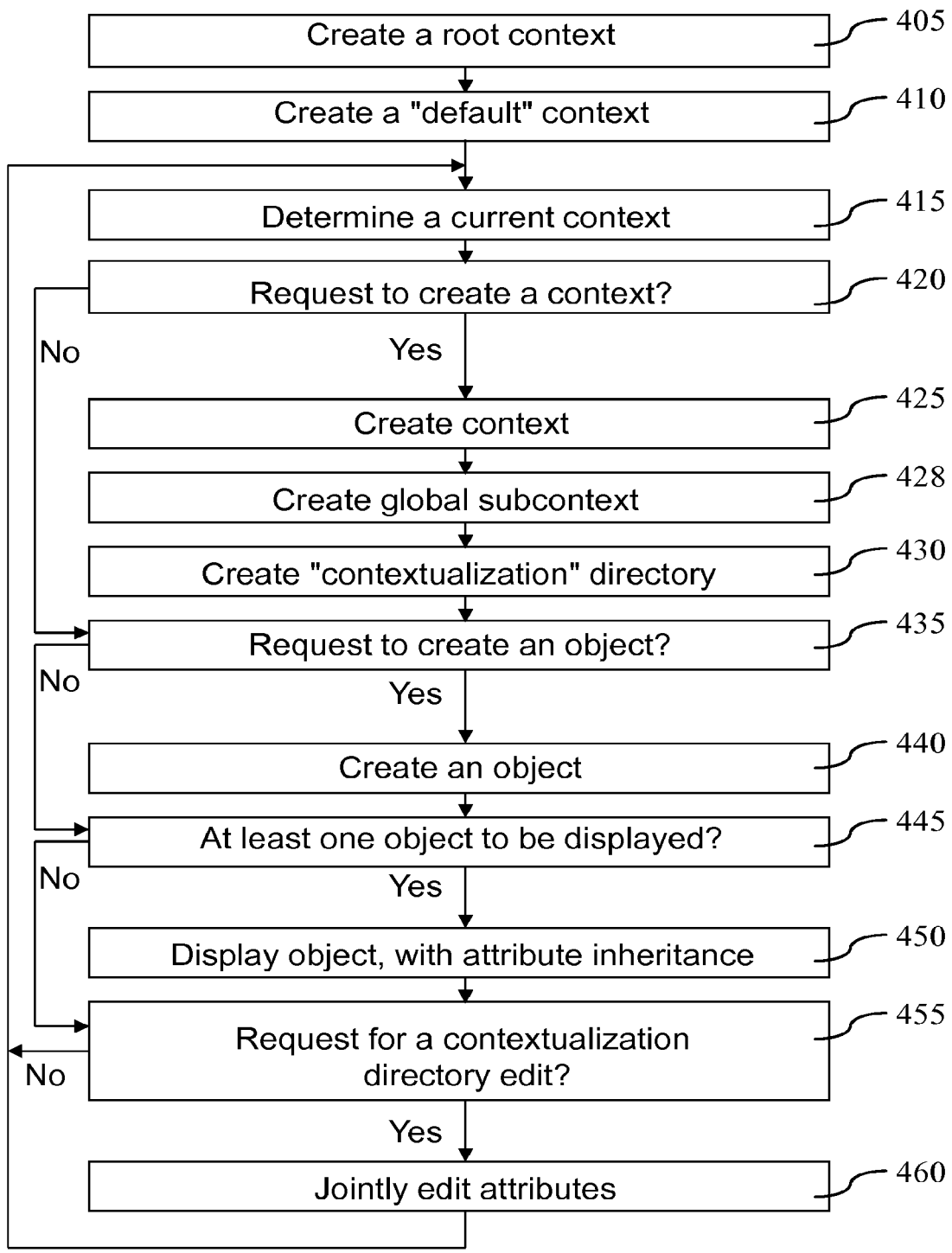
FIG. 4 represents, in the form of a logical diagram, steps in a particular embodiment of the method of organizing a system of objects according to the present invention.

The method of partially automatically organizing a system of objects according to the present invention makes it possible to manage objects and contexts in which objects are grouped. Each object belongs to a context which, itself, can belong to another context. FIG. 4 shows, in a particular embodiment of this method, a step 405 of creating a root context, which corresponds to a project, e.g. an image, a part of a program or an audio-visual program of animated images. During a step 410, a "default" context is created in the root context, containing all the objects that the software creates by default. These are objects that are managed automatically by the software system, but are made available to users, who can reference them in "object" type attributes. When an object is displayed, each object type of attribute of the object to be displayed that references an object of the default directory is set to the value of the object of the default directory.

Thanks to these provisions, the necessity of redefining attribute values shared by several objects in the tree can be avoided.

Then, during a step 415, a current context is determined. If a context is explicitly or implicitly selected, it is the current context. A context is explicitly selected when the user clicks on its representation or enters its address in a context bar. A context is implicitly selected when an object is selected: it is the lower level context in which the selected object is found. If no context is selected, the root context is the current context.

During a step 420, it is determined whether the user is requesting the creation of a new context, for example by selecting ("clicking") an icon representing the creation of a context. If yes, during a step 425, a new context is created in the current context having a default name (e.g. having as terminator "/contextN", where N is the first positive number such that "contextN" is not the name terminator of a context already present in the current context and, before said terminator, the chaining of the names of contexts to which the new context belongs).

During a step 428, a "global" subcontext is automatically created in the context that has just been created. It is noted that the global contexts serve to expose objects globally from a tree point to the entire subtree.

A global subcontext is formed in each context, except for the global subcontexts.

During the global subcontext formation step, each global subcontext has the properties of being able neither to be renamed nor deleted. Thus, relative references or pointers can be used by any object, at any point of the tree.

During a step 430, at the request of the user, a "contextualization directory", defining the attribute values for the objects of said context, i.e. of the current context and any context that the current context contains or is likely to contain, is created in the context that has just been created. These values are priority values, and each attribute of an object of the tree to be displayed is set to the value of the higher-rank attribute of the same name, of the same type and, possibly, with the same modifiers, to which a value has been allocated in a contextualization directory. In this way, all objects and contexts present in a context having a contextualization directory are consistent since they have shared attribute values.

If the result of step 420 is negative, go to a step 435. During the step 435, it is determined whether the user is requesting the creation of a new object, for example by selecting ("clicking") an icon representing the creation of an object. If yes, during a step 440, a new object is created in the current context having a default name (e.g. having as terminator "/objectN", where N is the first positive number such that "/objectN" is not the name terminator of an object already present in the current context and, before said terminator, the chaining of the names of contexts to which the new object belongs). Then, the user defines the attributes of the object created. If the result of step 435 is negative, go to a step 445.

During the step 445, it is determined whether at least one object must be displayed, for example for editing its attributes, values of its attributes and/or for display.

If yes, during a step 450, each object that must be displayed is displayed with its attributes and the values of its attributes, taking contextualization directories into account, as described above. When an attribute in a "contextualization" directory of a context or subcontext containing the object has been set to a value, the value of the compatible attribute of the edited object takes the value of the "contextualization" directory of the higher level context for which the attribute has been given a value. Thus, while each context is autonomous, it automatically inherits attribute values associated to the higher level context to which said context belongs.

During the step 450, the following are also displayed:

objects present in the context;

attributes of said objects;

values of said objects;

modifiers of the values of said attributes: animation curve modifiers defined by animation keys or a mathematical function, expression modifiers of values and/or mapping modifiers of the attribute;

if a contextualization directory exists in said context, values of attributes and modifiers defined in a global directory of said context; and the values of attributes and modifiers defined in each contextualization directory of a context comprising said context.

If the result of step 445 is negative, go to a step 455. During the step 455, it is determined whether the user has requested the "contextualization" directory of a context to be edited. If yes, during a step 460, the user views all the attributes of the "contextualization" directory and their values, in the current context, and can edit them as described with reference to FIGS. 1 and 2. If the result of step 455 is negative, or following the step 460, go back to step 415.

With regard to the data hierarchization method that is the subject of the present invention, the contexts used for utilizing several aspects of the present invention are defined below.

The purpose and problems related to the contexts are summarized below:

the richer the synthesis images, the more complex the 3D scenes that describe them are, since they are composed of a very large number of objects manipulated by the user; and the software system utilizing each of the methods that are the subjects of the present invention manages several images in parallel and therefore many more objects than other 3D software systems.

This therefore raises the problem of individually or simultaneously organizing, selecting and manipulating the thousands of objects contained in the sessions of the software system utilizing each of the methods that are the subjects of the present invention.

According to an aspect of the present invention, a data hierarchization method is utilized that has the following properties:

in the same way as a file system is used to organize the files of hard disks, this method organizes the objects into logical groups within directories called "contexts";

the contexts thus serve to group together and separate a set of objects so as to be able to organize them into logical groups. For example, a town consists of several thousand buildings. Starting from a blank canvas, it is impossible to manage the descriptions of all these buildings. But with the contexts and utilization of the method, the town can be organized into blocks, neighborhoods, districts, and finally into buildings:

```
"Town" context
    "District1" context
        "neighborhood1" context
            "block1" context
                building 1
                building 2
                building 3
            "block2" context
                building 4
                building 5
        "neighborhood2" context
        ...
    "District2" context ...
``` the contexts generated and managed by the method that is the subject of the invention have the following properties:
  they are hierarchical: there can be contexts within contexts;
  they have intelligible names and can be renamed;
  they can be moved or copied from one context to another;
  they can have shortcuts (instances in the software system utilizing each of the methods that are the subjects of the present invention) so that a context can be placed inside another context without being moved;
  they can receive object shortcuts (also called instances in the software system utilizing each of the methods that are the subjects of the present invention) so that objects are shared between several contexts without copying them by keeping a link between these objects. For example, a building can be stored in two different blocks and have the same attributes (characteristics/properties);
  they can contextualize the objects that they contain. That is to say, the attributes of the objects can be "overwritten" in a context without being actually modified (if moved into another context, the object regains the specific value of the overwritten attributes). Thus, by inserting a context or its shortcut into a context, it can be adapted specifically. For example, in block1 of the town, all the buildings have red facades, whereas in neighborhood2 the facades are blue; and
  they can be referenced by the objects to specify the content of a context as a dynamic list of objects.

For implementing the method that is the subject of the present invention:
  a root context is generated by default (such as the root "c:\," in Windows, registered trademark, or "/" in Linux, registered trademark). In the software system utilizing each of the methods that are the subjects of the present invention, this root context is for example called "project://" and is based on the URL syntax ("http://", "ftp://", etc.);
  all the contexts and subcontexts are created by default in the root context;
  each context has its own collection of objects and subcontexts;
  each context is serialized (attachment with links and connections) or deserialized in a complete and autonomous way;
  the contexts can have attributes (like the objects) that allow the shared attributes (same name, same type, etc.) to be overwritten, which is the same notion of compatibility as that used for grouping the attributes together in the attribute editor described with reference to FIGS. 1 and 2;
  the attributes of the contexts have the same properties and capacities as the attributes of the objects;
  a current context is defined, which is the context that was selected at a given time, explicitly or implicitly (when an object is selected because every object belongs to a context). The objects and contexts newly created via the "create" global menu of the software system are thus automatically created in the current context (when no object and no context have been selected, as indicated earlier, by default a context is placed in the root context when it is created);
  because all the objects necessarily belong to contexts, in addition to their name (formatted character string as an identifier in C++, registered trademark) they must define an absolute name, which is a path that allows the object to be accessed from the root. For example, "project://context1/context2/object", the syntax of which is similar to that of URLs (acronym for Uniform Resource Locator);
  the objects that are automatically created by default, called "default objects", (such as the default material "scene_material") are created in a "default" context, which is created automatically in the root and which is automatically instanced in all the subcontexts. Thus, the objects that reference these "default objects" reference them in a relative way (path=default/scene_material) rather than by an absolute path (project://default/scene_material);
  the contexts serve to limit the visibility of the objects in their interlinkage. Thus, an object that represents a 3D scene layer has an attribute that makes it possible to specify which objects are visible for the layer. These attributes that see the contents of contexts are referred to as "context" type attributes. Their value is the context's name. Their function is to provide a list of objects that are found in the specified context and in its subcontexts. If no context is specified, the value of the attribute is the context of the object to which it belongs. By default, "context" type attributes have no context specified; and The global contexts:
It has been seen that the contexts also serve to limit the visibility of objects when the contexts are used as a "context" type attribute value. Any object that has an attribute of this type sees all the objects of the specified context and all the subcontexts of this context, i.e. as described above, the value of a "context" type attribute is an object list comprising all the objects present in the context referenced by the attribute and all the objects present in the subcontexts of the context referenced, in a recursive way. In the example of the town, an object that has an attribute with the value "neighborhood1" therefore sees all the objects of "neighborhood1", "neighborhood1/block1", "neighborhood1/block2", etc.

This system is very practical for separating the objects of a project according to a construction logic (e.g. the town), but solely from bottom up, in the direction of the depth of the tree structure. During the construction of a 3D scene, there can be a need to share an object from a point of the tree. That is to say that there is a need for an object to be able to be accessed, regardless of the tree-structure sub-level, from a given level. With the system's default "bottom-up" behavior, in each branch of the tree where one wishes the object to be present, either the object must be duplicated (which would make the objects independent) or shortcuts must be created. The solution using shortcuts, although better, nevertheless has the disadvantage of not being dynamic. If one no longer wants the object to be visible in all the sub-levels, all the shortcuts for the object in question must be selected and removed.

Preferably, for implementing the method that is the subject of the invention, a so-called "global" context is utilized. During the context formation step, the software system automatically associates a subcontext called "global" to it. Thus, just like the "default" context, a "global" context is automatically created at the root of the tree.

Any object that is placed (directly or in the form of a shortcut) in a "global" context is made available to all the objects:
  of the context in which the "global" context in question, called the "parent" context, is found; and
  all the subcontexts of its parent context.

In the same way, the "global" context can receive contexts directly or in the form of a shortcut. The objects of the subcontexts of the global contexts are made available in the same way as in the previous point.

When it is created, the "global" context is empty. A global context shares the same properties as the ordinary contexts but cannot be renamed or deleted.

According to a first example, an object placed in the "global" subcontext of the root is available at each point in the tree of the project. According to a second example, that of the town, an object that describes a light placed in the "neighborhood1" context could illuminate all the neighborhood 1 buildings.

The global contexts allow the system to define a "top-down" visibility in the tree of the contexts. Thus, the global contexts of the subcontexts see all the objects that they contain as well as all the objects of the global contexts from this context to the root:

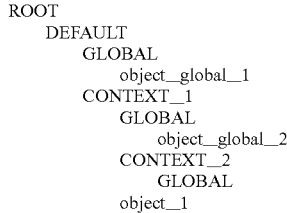

In the above tree, "ROOT/CONTEXT_1/CONTEXT_2/object_1" sees all the objects of the context " . . . /CONTEXT_2/GLOBAL" which, even if it is empty, provides via a "top-down" construct the objects "object_global_1" and "object_global_2". These objects can be referenced by "object_1" via the path "global/object_global_1", for example.

The global contexts solution has the advantage of being dynamic (unlike the use of shortcuts presented earlier). In effect, so that an object can no longer be seen by the subcontexts, it is just necessary to remove the object (by moving or deleting it) from the "global" context and, by "top-down" propagation, it is no longer accessible under a desired tree point.

With regard to the image layers, it is recalled that:
  the richer the images, the more complex they are and the longer they take to calculate (up to ten hours);
  the slightest change to an object requires the image to be completely recalculated which, if the change is minor, can cause a loss of time (for example, it takes ten hours to recalculate a few pixels);
  to avoid having to completely recalculate images, the image is broken up into "layers", which serve to separate the elements from each other. For example, each character and each decor element is in a separate layer so that, if only one character is modified, only its layer is recalculated. Thus an image with ten layers, of which one character in one layer is modified, will entail a recalculation of one hour, not ten hours;
  the remaining problem consists of effectively (thus visually) creating the layers.

According to an aspect of the present invention, the "drag and drop" functions are used to compose the image by placing the objects in the layers, which are manipulated in a layer editor of the software system utilizing each of the methods that are the subjects of the present invention.

For implementing this aspect of the method that is the subject of the present invention:
  each editor/viewer allows the drag-and-drop function to be initiated because the same object can be represented in different ways in the editors/viewers;
  for example, an automobile model can take the following form:

| Representation | Editor |
| --- | --- |
| Rendering in an image | Viewing images |
| Solid or mesh polygonal model | 3D scene accelerated by the GPU |
| Item in a tree | Context browser |
|  | Project explorer |
| Geometric definition file | File browser |
| Object selector | Attribute editor | the objects forming the 3D scene (of "SceneObject" type in the software system utilizing each of the methods that are the subjects of the present invention) are placed on the layer items in the layer editor;
if an object is not in the image, i.e. the object is not visible in any of the layers, it is added in the layer and thereby becomes visible in the image;
if the placed object is visible in the image, it is removed from the layers in which it was visible and then added in the destination layer so that the placed object is only visible (referenced) once in the image. This consequently avoids duplications of objects in different layers.

For example, with the screen 105, illustrated in FIG. 1, the user can perform a drag-and-drop operation to the layer editor 195 from the object list 125, from the image view viewport 180, from the viewport 130 displaying the content of the last object selected, or from the browser 190.

According to an aspect of the present invention, the "drag and drop" functions are used to compose the image by placing the objects in the layers, which are manipulated in a layer editor of the software system utilizing each of the methods that are the subjects of the present invention.

Figure 5:
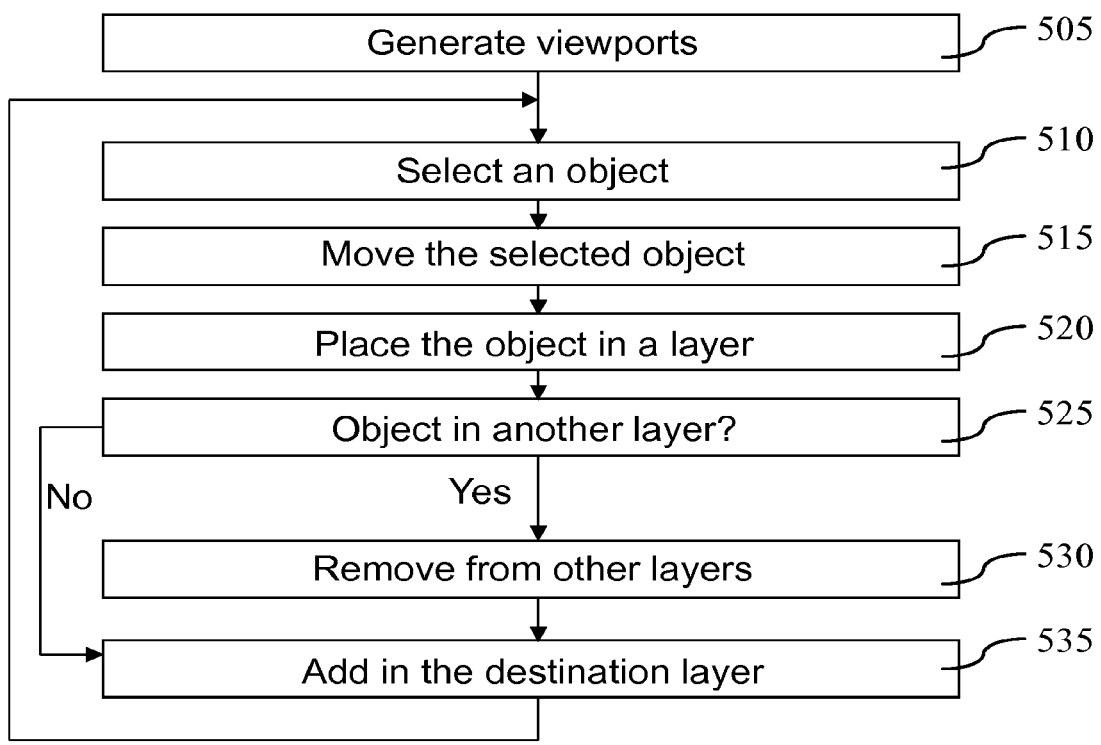
FIG. 5 represents, in the form of a logical diagram, steps in a particular embodiment of the method of editing layers according to the present invention.

FIG. 5 shows a step 505 of generating a layer editor viewport and at least one viewport for representing objects. For example, a representation of the content of at least one object selected by clicking on its name or on the name of an image containing it ("image view" viewport), a representation of at least one object selected by its polygonal model ("3D scene" viewport), at least one representation of at least one object selected by its name in a tree ("context browser" viewport and "project browser" viewport), a representation of at least one object selected by its geometric definition ("file browser" viewport) and a representation of at least one object by its attributes ("attribute editor" viewport) are generated.

During a step 510, the user selects an object by positioning the cursor of a pointing device, e.g. a mouse, over a representation of an object in a viewport for representing objects and clicks on this object, without releasing the button of the pointing device ("drag" stage of the "drag-and-drop").

During a step 515, the user moves the cursor of the pointing device over a representation of a layer, called the "destination" layer, in a layer editor viewport. During a step 520, the user releases the button of the pointing device ("drop" stage of the "drag-and-drop"). During a step 525, it is determined whether the object selected is in another layer of the same image:

- if the placed object is visible in the image, it is removed from each layer in which it was previously visible, during a step 530, and then added in the destination layer, step 535, so that the placed object is only visible (referenced) once in the image. This consequently avoids duplications of objects in different layers;
- if an object is not in the image, i.e. the object is not visible in any of the layers, during step 535, it is added in the layer and thereby becomes visible in the image.

Then, one goes back to step 510.

The invention claimed is:

1. A method for processing information for jointly editing attributes of a plurality of objects, that comprises:
    a step of selecting a plurality of objects having attributes, an object being capable of actions and the actions of said object being able to be parameterized by modifying its attributes;
    a step of automatically displaying a single attribute edit field for editable attributes of the same name, the same type of values, of at least two of the objects selected; and
    a step of jointly editing the value of editable attributes of the same name of at least two of the objects selected in a viewport for editing multiple attributes comprising a list of attributes of objects selected, the viewport gathering the attributes which are editing compatible, for explicitly jointly modifying the value of the gathered attributes.

2. The method according to claim 1, wherein during the display step, a single attribute edit field is displayed for editable attributes of the same name and same type of at least two of the objects selected, said attributes of the same name and same type being edited jointly during the editing step.

3. The method according to claim 1, wherein during the display step, a single attribute edit field is displayed for editable attributes of the same name having the same modifier or modifiers, said attributes of the same name and having the same modifier or modifiers being edited jointly during the editing step.

4. The method of claim 1, wherein during the display step, a single attribute edit field is displayed for editable attributes of the same name having the same capacity for modification over time or in space, said attributes of the same name and same capacity being edited jointly during the editing step.

5. The method of claim 1, further comprises a step of selecting an attribute to be edited that is shared by at least two of the objects selected, and a step of selecting a mode of jointly editing the value of this attribute shared by at least two selected objects.

6. The method of claim 5, wherein, for a said editing mode, during the editing step, all the attributes of the various objects selected having this shared attribute are set to the value of the shared attribute of the last object selected.

7. The method of claim 5, wherein, for a said editing mode, during the editing step, the selected attribute of the various selected objects that have this attribute is given the same value.

8. The method of claim 5, wherein, for a said editing mode, during the editing step, the selected attribute of the various selected objects that have this attribute is altered by the same value.

9. The method of claim 5, wherein, for a said editing mode, during the editing step, the value of the same attribute of an object is copied and the attribute being edited is set to this value.

10. The method of claim 5, wherein, for a said editing mode, during the editing step, an object not selected is set to the value of the shared attribute.

11. The method of claim 1, wherein, during the step of selecting a plurality of objects, the content of each of the objects selected is displayed in a shared viewer viewport and, during the joint editing step, the contents of the objects whose attributes are displayed in the shared viewer viewport are modified in real time.

* * * * *